United States Patent
Galmiche (10) Patent No.: US 11,923,735 B2
(45) Date of Patent: Mar. 5, 2024

(54) ROTOR WITH NON-THROUGH SHAFT AND ASSOCIATED ROTARY ELECTRIC MACHINE

(71) Applicant: GE Energy Power Conversion Technology Limited, Warwickshire (GB)

(72) Inventor: Christophe Galmiche, Toul (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 213 days.

(21) Appl. No.: 17/413,930

(22) PCT Filed: Dec. 12, 2019

(86) PCT No.: PCT/EP2019/084834
§ 371 (c)(1),
(2) Date: Jun. 14, 2021

(87) PCT Pub. No.: WO2020/120658
PCT Pub. Date: Jun. 18, 2020

(65) Prior Publication Data
US 2022/0123636 A1    Apr. 21, 2022

(30) Foreign Application Priority Data
Dec. 14, 2018    (FR) ........................................ 1872969

(51) Int. Cl.
*H02K 17/16*    (2006.01)
(52) U.S. Cl.
CPC .......... *H02K 17/165* (2013.01); *H02K 17/16* (2013.01); *H02K 17/166* (2023.05)

(58) Field of Classification Search
CPC ...... H02K 17/165; H02K 7/003; H02K 17/16; H02K 17/00; H02K 17/02; H02K 17/166; H02K 17/168
(Continued)

(56) References Cited

U.S. PATENT DOCUMENTS

| 2,333,538 A | 8/1941 | Liwschitz |
| 2,350,012 A | 5/1942 | Brady |

(Continued)

FOREIGN PATENT DOCUMENTS

| AT | 509042 A2 | * | 5/2011 | |
| CA | 2325899 A1 | * | 5/2001 | ............... H02K 1/26 |

(Continued)

OTHER PUBLICATIONS

International Search Report from International Appl. No. PCT/EP2019/084834, dated Jan. 16, 2020.

*Primary Examiner* — Alexander A Singh
(74) *Attorney, Agent, or Firm* — WOOD IP LLC (57) ABSTRACT

The rotor with a non-through shaft for a rotary electric machine comprises a cylindrical magnetic body clamped between two half-shafts, each comprising an attachment flange connected to the magnetic body, axial housings being uniformly provided in the magnetic body on at least one diameter of the magnetic body in order to house conductive bars. At least one attachment flange comprises insertion holes, each arranged facing a housing for inserting the conductive bars into the housings and the exterior diameter of the attachment flange is substantially equal to the exterior diameter of the magnetic body, the attachment flange comprising as many insertion holes as housings.

20 Claims, 6 Drawing Sheets

(58) Field of Classification Search
USPC ....................................................... 310/211
See application file for complete search history.

(56) References Cited

U.S. PATENT DOCUMENTS

| | | | |
|---|---|---|---|
| 3,395,299 A * | 7/1968 | Quay | H02K 3/51 |
| | | | 310/216.069 |
| 3,742,595 A * | 7/1973 | Lykes | H02K 15/12 |
| | | | 310/43 |
| 3,832,583 A | 8/1974 | Chang | |
| 4,363,986 A * | 12/1982 | Joho | H02K 7/04 |
| | | | 310/194 |
| 4,453,101 A | 6/1984 | Nelson | |
| 5,642,010 A | 6/1997 | Carosa et al. | |
| 6,064,172 A * | 5/2000 | Kuznetsov | G01R 31/346 |
| | | | 318/434 |
| 6,232,692 B1 | 5/2001 | Kliman | |
| 6,515,395 B1 | 2/2003 | Jansen | |
| 6,874,221 B2 | 4/2005 | Jansen et al. | |
| 7,451,538 B2 | 11/2008 | Pizzichil | |
| 7,504,756 B2 | 3/2009 | Caprio et al. | |
| 7,893,589 B2 | 2/2011 | Yu et al. | |
| 8,344,581 B2 | 1/2013 | Yabe et al. | |
| 8,361,559 B2 | 1/2013 | Chan et al. | |
| 8,421,296 B2 | 4/2013 | Lateb et al. | |
| 8,466,597 B2 | 6/2013 | Yabe et al. | |
| 8,631,559 B2 | 1/2014 | Meyer et al. | |
| 9,154,008 B2 | 10/2015 | Hashish | |
| 9,166,462 B2 | 10/2015 | Yabe et al. | |
| 9,263,929 B2 | 2/2016 | Arimatsu | |
| 11,218,044 B2 | 1/2022 | Galmiche et al. | |
| 11,303,173 B2 | 4/2022 | Galmiche et al. | |
| 11,316,393 B2 | 4/2022 | Galmiche et al. | |
| 11,381,135 B2 | 7/2022 | Galmiche et al. | |
| 2002/0145357 A1 | 10/2002 | Li et al. | |
| 2003/0102762 A1 | 6/2003 | Jansen et al. | |
| 2005/0134137 A1 | 6/2005 | Sweo | |
| 2012/0262024 A1 | 10/2012 | Kleynhans et al. | |
| 2013/0049517 A1 | 2/2013 | Lang | |
| 2013/0154430 A1 | 6/2013 | Dragon et al. | |
| 2015/0372576 A1 | 12/2015 | Hembroff | |
| 2017/0054351 A1 * | 2/2017 | Ishikawa | H02K 1/12 |
| 2018/0026505 A1 * | 1/2018 | Galmiche | H02K 17/165 |
| | | | 310/211 |
| 2019/0181736 A1 | 6/2019 | Frohlich | |
| 2020/0112216 A1 | 4/2020 | Galmiche et al. | |

FOREIGN PATENT DOCUMENTS

| | | | |
|---|---|---|---|
| CA | 2325899 A1 | | 5/2001 |
| CN | 104485773 A | * | 4/2015 |
| DE | 578782 C | | 6/1933 |
| DE | 905044 C | | 2/1954 |
| DE | 19956042 A1 | | 5/2001 |
| DE | 102012110147 A1 | | 4/2014 |
| DE | 102012110157 A1 | * | 6/2014 |
| EP | 0280192 A1 | | 8/1988 |
| EP | 0608675 A1 | | 8/1994 |
| EP | 0609645 A1 | | 8/1994 |
| EP | 1009090 A1 | | 6/2000 |
| EP | 2615726 A1 | | 7/2013 |
| EP | 3051674 A1 | | 8/2016 |
| EP | 3051675 A1 | | 8/2016 |
| JP | H06153470 A | | 5/1994 |
| JP | 2015035870 A | | 2/2015 |
| JP | 2015109743 | | 6/2015 |
| JP | 2015208102 A | | 11/2015 |
| WO | 2013033292 A2 | | 3/2013 |
| WO | 2015200033 A1 | | 12/2015 |
| WO | 2017116089 A1 | | 7/2017 |
| WO | 2018036760 A1 | | 3/2018 |
| WO | 2020/120658 A1 | | 6/2020 |

\* cited by examiner

ROTOR WITH NON-THROUGH SHAFT AND ASSOCIATED ROTARY ELECTRIC MACHINE

TECHNICAL FIELD

The present invention relates to rotary electric machines with squirrel cage or wound rotor and more particularly relates to a rotor comprising a non-through shaft.

The present invention also relates to a rotary electric machine comprising such a rotor.

BACKGROUND

The torque and power developed by a rotary electric machine depend in particular on the intensity of the induced currents flowing through the conductive bars or the rotor coils for an asynchronous machine or on the intensity of the currents flowing through the rotor coils for a synchronous machine.

To increase the intensity of the currents flowing through the rotor, it is necessary to increase the section of the conductive bars or the wire of the coils.

Document EP0609645 describes a laminated rotor comprising a non-through shaft for an asynchronous squirrel cage electric motor.

Figure 1:
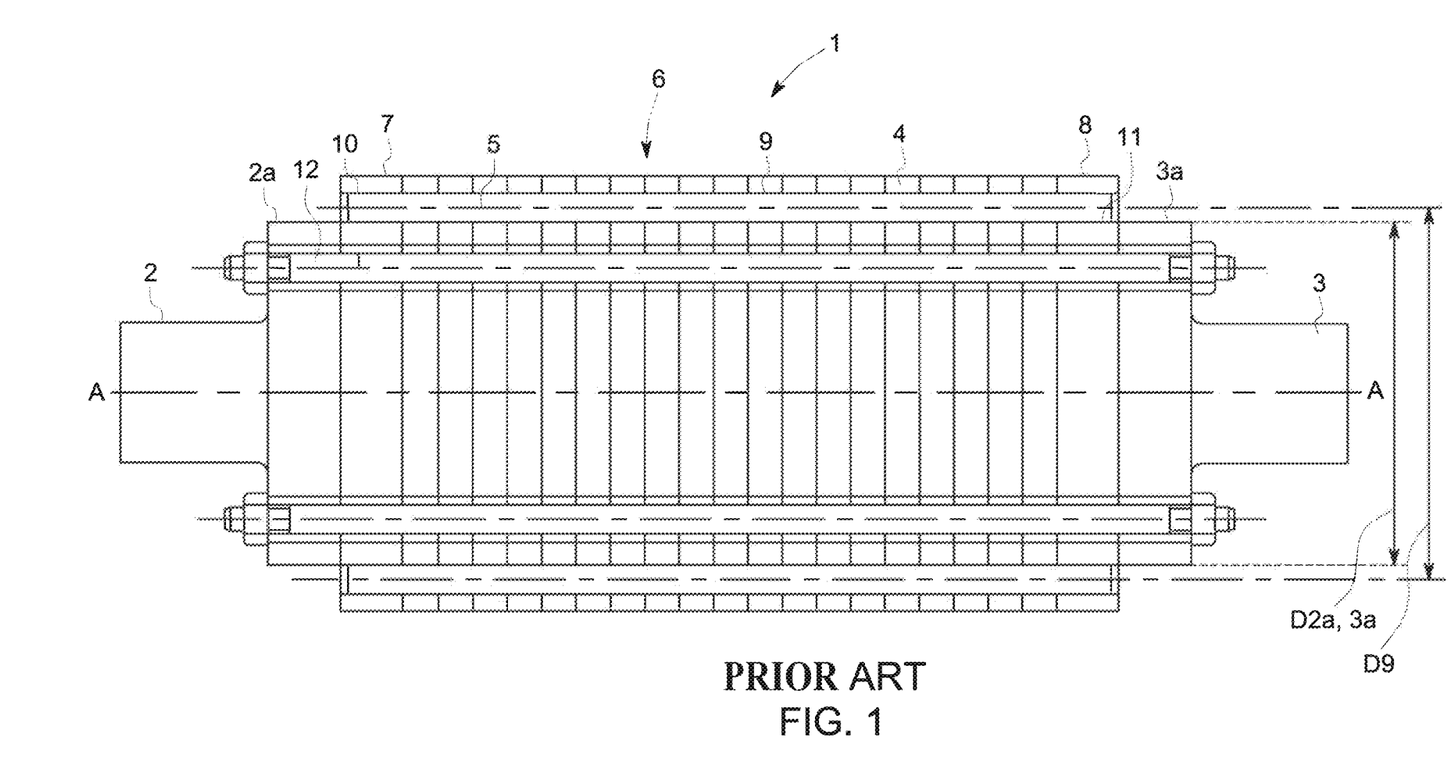
FIG. 1 illustrates a rotor comprising a non-through shaft of an asynchronous rotary electric machine according to the prior art.

Reference is made to FIG. 1 which shows a section of such a rotor 1 in an axial direction.

The rotor comprises two half-shafts 2 and 3 between which are inserted magnetic sheets 4 kept compacted by tie rods 12 connecting the two half-shafts 2 and 3.

The magnetic sheets 4 form the magnetic mass 6 of the rotor.

Each half-shaft 2, 3 comprises an attachment flange 2a, 3a of exterior diameter D2a, 3a and connected to the magnetic mass 6 by means of identical short-circuit rings or discs 7 and 8.

Conductive bars 5 are housed in housings 9 inserted into the magnetic mass 6 and distributed uniformly on a diameter D9 of the magnetic mass and in holes 10 and 11 inserted into the short-circuit rings or discs 7 and 8 to form a squirrel cage.

The circular holes 10 and 11 are substantially coaxial with the cylindrical housings 9. The housings 9 and the holes 10 and 11 are dimensioned so that the conductive bars 5 can freely expand under the effect of heat when the bars are traversed by an electric current.

The implantation diameter D9 of the conductive bars and the holes 10, 11 is greater than the exterior diameter D2a, 3a of the attachment flanges 2a, 3a to insert the conductive bars 5 into the holes 10, 11 and the housings 5.

To increase the section of the conductive bars 5, it is necessary to reduce the diameter D2a, 3a of the attachment flanges 2a, 3a so as to insert the conductive bars 5 into the rotor 1.

However, the attachment flanges 2a and 3a ensure the compaction of the magnetic mass 6.

A decrease in the diameter D2a, 3a causes decompaction on a periphery of the magnetic mass 6.

The decompaction of the periphery of the magnetic mass 6 makes the rotor 1 more flexible in bending resulting in a decrease in its critical speed and in the speed range of use of the rotor.

Document DE19956042 discloses a rotor with a non-through shaft for an asynchronous rotary electric machine comprising a magnetic mass formed by a stack of sheets compacted between two half-shafts comprising attachment flanges enclosing the magnetic mass and the rotor short-circuit discs.

The magnetic mass is kept compacted by tie rods connecting the two half-shafts.

The exterior diameter of the attachment flanges is the same as the exterior diameter of the magnetic mass housing the conductive bars.

The compaction pressure of the magnetic mass is uniform over the entire section of the magnetic mass.

However, the conductive bars are encapsulated in the magnetic mass and the short-circuit discs.

It is not possible to insert the conductive bars into the compacted magnetic mass, nor to remove the conductive bars from the compacted magnetic mass of the rotor without removing the tie rods.

It is therefore proposed to overcome the disadvantages of squirrel cage rotors for rotary electric machines or wound rotors according to the prior art.

In view of the above, according to one aspect, provision is made of a rotor with a non-through shaft for a rotary electric machine, comprising a cylindrical magnetic mass clamped between two half-shafts each comprising an attachment flange connected to the magnetic mass, axial housings being uniformly provided in the magnetic mass on at least one diameter of the magnetic mass in order to house conductive bars.

SUMMARY

At least one attachment flange comprises insertion holes each disposed facing a housing for inserting the conductive bars into the housings and the exterior diameter of the attachment flange is substantially equal to the exterior diameter of the magnetic mass, each attachment flange including as many insertion holes as housings.

According to one feature, the rotor further comprises two short-circuit discs interposed between the attachment flanges of the half-shafts and one of the ends of the magnetic mass, and conductive bars inserted into the housings so that the conductive bars and the short-circuit discs form a squirrel cage.

Preferably, the housings are cylindrical and the insertion holes are circular, the housings and the holes being substantially coaxial.

Advantageously, the housings and the insertion holes have a substantially identical rectangular or rounded rectangular section.

Preferably, the insertion holes open towards the outer periphery of the rotor.

According to another feature, the rotor comprises coils inserted into the housings and the insertion holes, each coil comprising several strands held in an insulating sleeve and extending in the axial direction so as to form an asynchronous or synchronous wound rotor.

Advantageously, the insertion holes and the housings open in a radial direction to allow the insertion of the coils, a wedge being inserted into the magnetic mass between each coil and the outer periphery of the magnetic mass to hold the coil in its housing.

Preferably, the housings and the insertion holes have a substantially identical rectangular or rounded rectangular section.

According to another feature, the magnetic mass comprises compacted magnetic sheets.

Advantageously, the magnetic mass comprises a stack of metal plates.

Preferably, the magnetic mass comprises a metal body.

According to yet another feature, the rotor further comprises screws distributed uniformly on at least one diameter of the rotor so as to keep the magnetic mass compacted between the half-shafts, the implantation diameter of the screws being less than the implantation diameter of the housings.

Advantageously, the rotor further comprises tie rods distributed uniformly on at least one diameter of the rotor so as to keep the magnetic mass compacted between the half-shafts, the implantation diameter of the tie rods being less than the implantation diameter of the housings.

Preferably, the attachment flange comprises a chamfer on its face opposite to the magnetic mass and extending from the outer periphery of the flange so as to cover the insertion holes.

Advantageously, the attachment flange further comprises counter sinks distributed uniformly on the implantation diameter of the insertion holes so as to reduce the length of the insertion holes.

According to another feature, the attachment flange comprises a peripheral recess so as to reduce the length of the insertion holes.

Preferably, each insertion hole comprises an internal thread, a plug being screwed into the internal thread so as to close the free end of the attachment flange.

Advantageously, each insertion hole further comprises a groove comprising a seal so as to seal the contact between the plug and the attachment flange.

Preferably, the plug further includes a check valve to depressurise the housing.

According to yet another aspect, provision is made of a rotary electric machine comprising a rotor as defined above.

BRIEF DESCRIPTION OF THE DRAWINGS

Other features and advantages of the invention will become apparent upon reading the following description of embodiments of the invention, given only by way of non-limiting examples and with reference to the drawings wherein.

Figure 2:
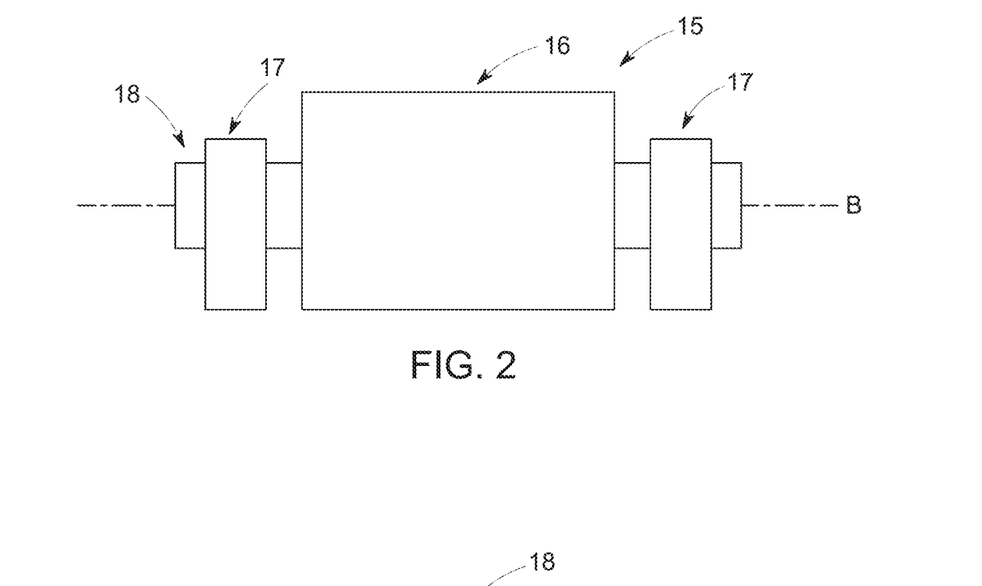
FIG. 2 illustrates an embodiment of a rotary electric machine with squirrel cage or wound rotor without a through shaft.

Reference is made to FIG. 2 which illustrates an embodiment of a rotary electric machine 15 comprising a stator 16, bearings 17 and a rotor 18 inserted into the stator 16 and the bearings 17.

The rotor 18 comprises a non-through rotor shaft made for example of steel, with an axis B coincident with the axis of rotation of the rotor 18.

Figure 3:
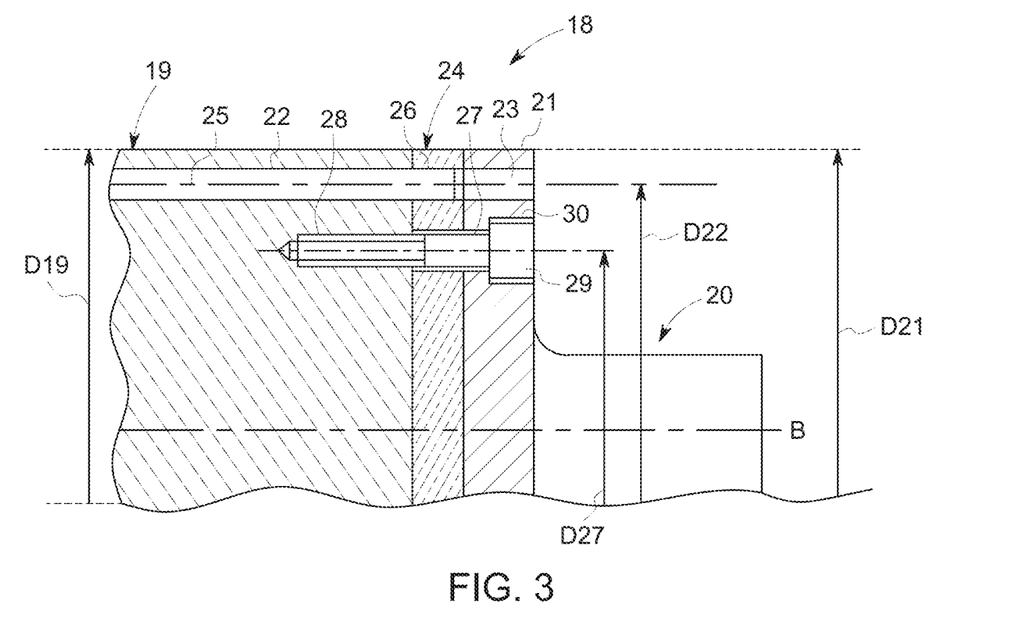
FIG. 3 illustrates a partial section in an axial direction of a first embodiment of the rotor.

FIG. 3 illustrates a partial section in an axial direction of a first embodiment of the rotor 18 comprising a squirrel cage.

The rotor 18 comprises a cylindrical magnetic mass 19, of exterior diameter D19, clamped between two half-shafts (a single half-shaft 20 being shown) by means of an attachment flange 21 connected to the magnetic mass.

DETAILED DESCRIPTION

Axial housings 22 are uniformly provided in the magnetic mass 19, along a diameter D22 of the magnetic mass.

They pass through the magnetic mass in an axial direction and are intended to house conductive bars 25.

The exterior diameter D21 of the attachment flange 21 is substantially equal to the exterior diameter D19 of the magnetic mass. For example, the exterior diameter D21 of the attachment flange 21 is equal to a value comprised between 0.95 and 1.03 times the exterior diameter D19 of the magnetic mass, preferably between 0.98 and 1 time the exterior diameter D19 of the magnetic mass.

Each attachment flange 21 includes holes 23 for inserting the conductive bars 25 into the housings 22.

Each attachment flange 21 includes as many holes 23 for inserting the conductive bars 25 as housings 22, each insertion hole 23 being disposed facing a housing 22.

The housings 22 are cylindrical, and the holes 23 are circular and coaxial with the housings 22.

Alternatively, the housings 22 and the holes 23 have an identical rectangular or rounded rectangular section, the sections of the housings and the holes being provided facing each other.

The rotor 18 further comprises two short-circuit discs 24 interposed between the attachment flanges 21 of the half-shafts 20 and one of the ends of the magnetic mass 19, and conductive bars 25 inserted into the housings 22 so that the conductive bars 25 and the short-circuit discs 24 form a squirrel cage.

The housings 22 are dimensioned to compensate for the expansion of the conductive bars 25 under the effect of the heat generated by the flow of the current in the bars 25 and thus prevent a thermomechanical unbalance of the rotor caused by the expansion of the bars when they cannot expand freely, in particular in an axial direction.

The short-circuit discs 24 and the conductive bars 25 are made for example of copper and are electrically connected to one another to form a squirrel cage when the rotor is rotated.

The conductive bars 25 can be made of alloyed copper, aluminium, alloyed aluminium or any other electrically conductive material.

Each short-circuit disc 24 comprises through holes 26 wherein the conductive bars 25 are respectively housed.

The ends of the conductive bars 25 are not in contact with the attachment flanges 21 to prevent currents flowing through the conductive bars 25 from passing through the attachment flanges 21.

Each conductive bar end is inserted into an insertion hole 23 and a hole 26 with a radial clearance in order to compensate for the expansion of the conductive bars 25 under the effect of the heat generated by the flow of the current, and to allow the insertion of the conductive bars 25 into the magnetic mass 19 when the magnetic mass 19 is compacted between the half-shafts 20.

When the rotor 18 is rotated at a speed of, for example, 10000 revolutions per minute, the bars 25 are projected towards the outside of the magnetic mass 19 under the effect of centrifugal force.

The bars 25 contact the short-circuit discs 24 creating an electric connection between the bars 25 and the short-circuit discs 24 forming the squirrel cage.

The magnetic mass 19 comprises a metal body.

Screws 27 are uniformly distributed on a diameter D27 of the rotor 18 so as to keep the magnetic mass 19 compacted between the half-shafts 20.

The implantation diameter D27 of the screws 27 is less than the implantation diameter D22 of the housings 22.

The screws 27 are engaged in the internal threads 28 of the magnetic mass 19.

The head 29 of the screws 27 can be housed in a countersink 30 of the attachment flange 21.

The conductive bars 25 can be inserted and removed from the magnetic mass 19 without disassembling the rotor 18.

Furthermore, since the diameter D21 of the attachment flanges 21 is substantially equal to the exterior diameter D19 of the magnetic mass 19, the compaction of the magnetic mass 19 is uniform over the entire section of the magnetic mass without decompaction of the periphery of the magnetic mass so that the rotor 18 is stiffer in bending for higher rotational speeds.

Alternatively, the rotor 18 may comprise conductive bars 25 distributed over several diameters of the magnetic mass 19, the short-circuit discs 24 and the attachment flanges 21 including holes and insertion holes facing each housing 22 to insert and remove the conductive bars 25.

Figure 4:
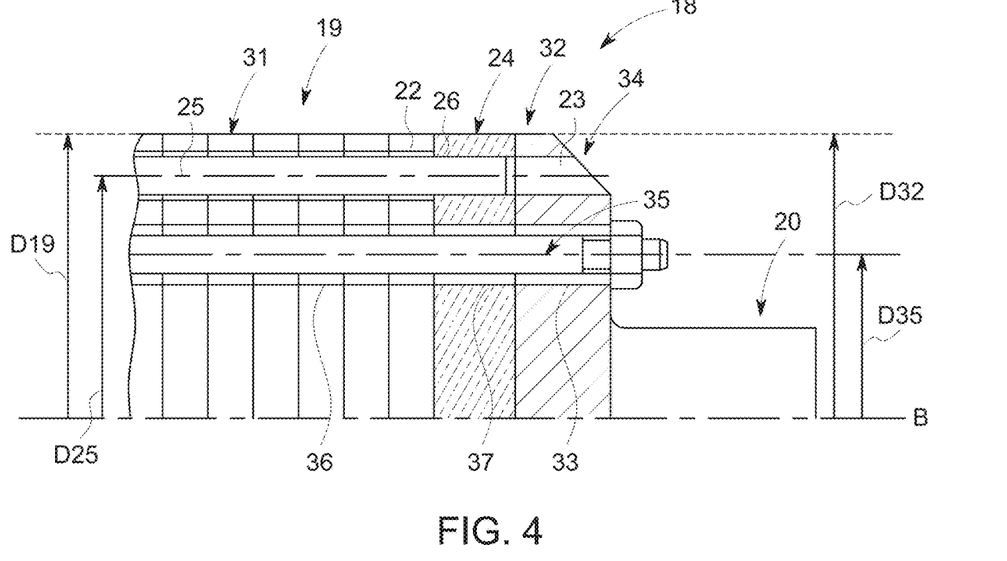
FIG. 4 illustrates a partial section in an axial direction of a second embodiment of the rotor.

FIG. 4 illustrates a partial section in an axial direction of a second embodiment of the rotor 18.

The magnetic mass 19 made from magnetic sheets 31, the short-circuit disc 24 and the half-shaft 20 can be seen.

The conductive bar 25 is inserted into the housing 22 of the magnetic mass 19 and into the hole 26 of the short-circuit disc 24.

The half-shaft 20 comprises an attachment flange 32 of exterior diameter D32 which is substantially equal to the exterior diameter D19 of the magnetic mass 19. For example, the exterior diameter D32 is equal to a value comprised between 0.95 and 1.03 times the exterior diameter D19 of the magnetic mass, preferably between 0.98 and 1 times the exterior diameter D19 of the magnetic mass.

The attachment flange 32 comprises the insertion hole 23, a passage hole 33, and a chamfer 34 on its face opposite to that facing the magnetic mass 19, which extends from its outer periphery so as to cover the insertion hole 23.

The chamfer 34 reduces the length of the hole 23 to facilitate the insertion of the conductive bar 25 into the magnetic mass 19 without affecting the compaction quality of the rotor, and reduces the mass of the rotor 18. The critical speed of the rotor 18 is increased.

The rotor 18 further comprises tie rods 35 uniformly distributed on a diameter D35 of the rotor 18 so as to keep the magnetic mass 19 compacted between the half-shafts 20.

The implantation diameter D35 of the tie rods 35 is less than the implantation diameter D25 of the housings 25.

The tie rod 35 passes through the passage hole 33 of the attachment flange 32, and the passages 36 and 37 provided in the magnetic mass 19 and in the short-circuit disc 24.

Alternatively, the magnetic mass 19 comprises compacted metal plates replacing the compacted magnetic sheets.

The thickness of the magnetic sheets 31 is preferably less than 2 mm, preferably 0.65 mm, for example 0.5 mm.

The thickness of the metal plates is preferably greater than 5% of the exterior diameter D19 of the magnetic mass 19.

According to another variant, the metal plates are connected to each other by screws embedded in the plates, and the metal plates located at the ends of the magnetic mass are connected to the half-shafts by screws embedded in the attachment flanges.

Figure 5:
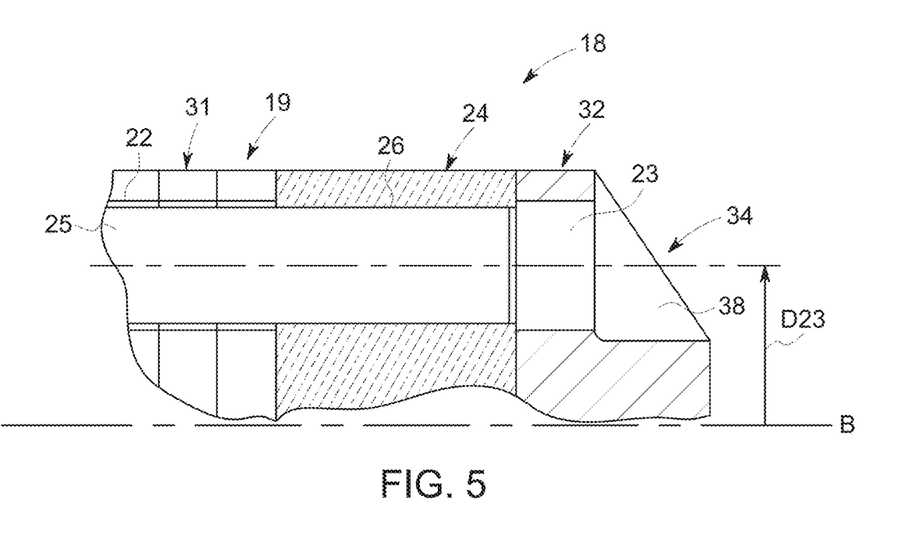
FIG. 5 illustrates a partial section in an axial direction of a third embodiment of the rotor.

FIG. 5 illustrates a partial section in an axial direction of a third embodiment of the rotor 18.

This embodiment differs from the embodiment illustrated in FIG. 4 in that the attachment flange 32 further comprises countersinks 38 distributed uniformly on the implantation diameter D23 of the insertion holes 23 so as to reduce the length of the insertion holes.

The countersinks 38 allow to remove an amount of material greater than that removed in the previous embodiment to further lighten the rotor 18 and increase the critical speed of the rotor 18.

The countersinks 38 facilitate the insertion of the conductive bars 25 into the magnetic mass 19, the length of the insertion hole 23 being shorter than in the previous embodiment without affecting the quality of compaction of the magnetic mass.

Figure 6:
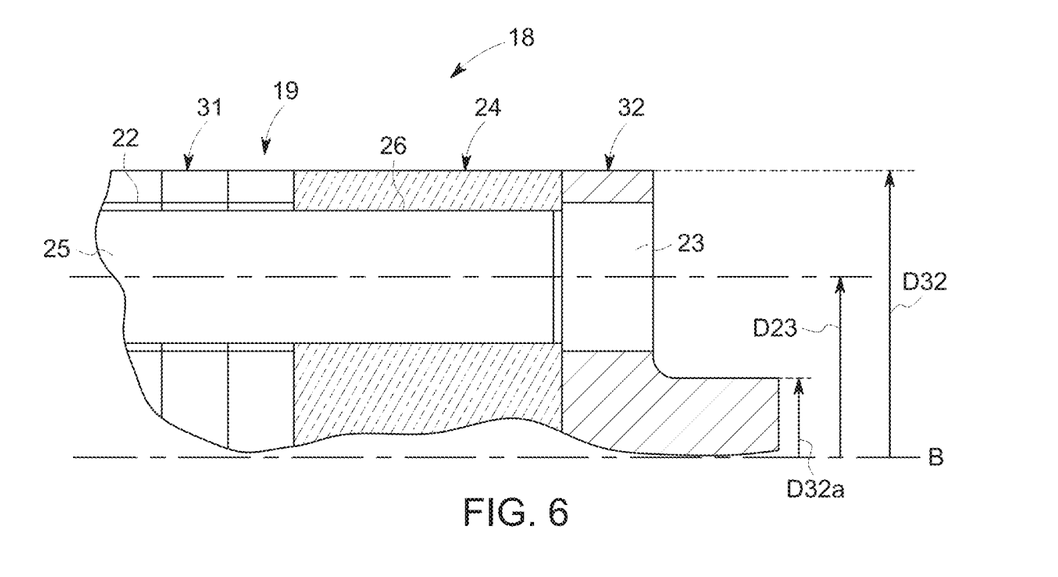
FIG. 6 illustrates a partial section in an axial direction of a fourth embodiment of the rotor.

FIG. 6 illustrates a partial section in an axial direction of a fourth embodiment of the rotor 18.

This embodiment differs from the embodiment illustrated in FIG. 5 in that the countersinks 38 of the attachment flange 32 are replaced by a peripheral recess so as to reduce the length of the insertion holes 23.

The attachment flange 32 comprises a first axial thickness extending from the axis B to a diameter D32a less than the implantation diameter D23 of the insertion holes 23, and a second axial thickness extending from the start of the peripheral recess up to the diameter D32.

The first thickness is greater than the second thickness.

The recess allows to remove an amount of material greater than that removed in the previous embodiment to lighten the rotor 18 and increase the critical speed of the rotor 18.

The recess facilitates the insertion of the bars 25 into the magnetic mass 19, the length of the insertion hole 23 being reduced without affecting the quality of compaction of the magnetic mass.

The peripheral recess also allows to reduce noise and friction losses, for example from air, during rotation of the rotor 18 compared to the embodiments described above.

Figure 7:
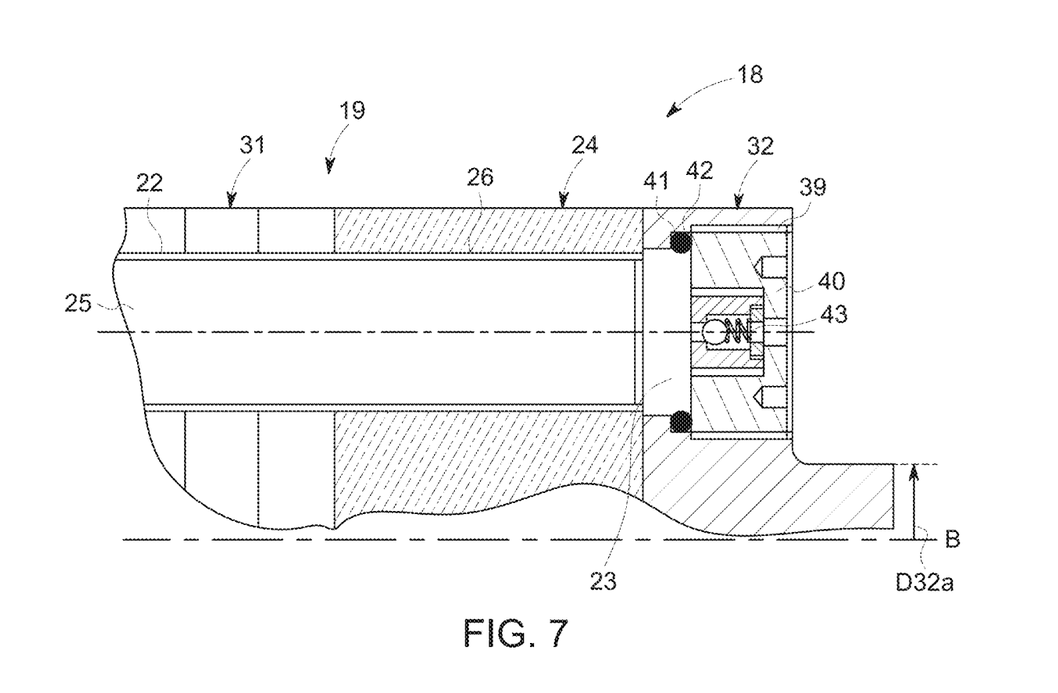
FIG. 7 illustrates a partial section in an axial direction of a fifth embodiment of the rotor.

FIG. 7 illustrates a partial section in an axial direction of a fifth embodiment of the rotor 18.

This embodiment differs from the embodiment illustrated in FIG. 6 in that the hole 23 comprises an internal thread 39.

A plug 40 is screwed into the internal thread 39 so as to close the free end of the attachment flange 32.

The plug 40 prevents hissing noises and friction losses, for example from air, when the rotor 18 is rotating.

In addition, the plug 40 prevents the phenomena of abrasion and erosion of the insertion holes 23 caused by the circulation of a fluid and by abrasive particles contained in the fluid when the rotor has a peripheral speed greater for example than 150 m/s.

The insertion hole 23 further comprises a groove 41 comprising a seal 42 so as to seal the contact between the plug 40 and the attachment flange 32.

The seal 42 limits damage to conductive bars 25 when the rotor 18 is used in a chemically aggressive environment.

The seal 42 is preferably an O-ring seal, made of stainless steel, polymer or metal, preferably made in one piece without cutting or splicing.

The plug 40 further comprises a check valve 43 for depressurising the housing 22 in the event of rapid depressurisation of the enclosure of the rotary electric machine, for example when the latter is used and incorporated in a motor-compressor.

Alternatively, the plug 40 does not comprise a check valve 43 and the attachment flange 32 comprises the groove 41 comprising the seal 42.

According to another variant, the plug 40 does not comprise a check valve 43 and the attachment flange 32 does not comprise the groove 41 or the seal 42.

The embodiment with a plug 40 can also be applied to the other embodiments described in FIGS. 3 to 5.

In the embodiments of the rotor 18 described above, the housings 22, the insertion holes 23, the conductive bars 25 and the holes 26 of the short-circuit disc 24 have a circular section.

According to other embodiments, as shown in FIGS. 8 to 11, the sections can be of various shapes, the section of the housings 22, the insertion holes 23, the conductive bars 25 and the holes 26 being substantially identical.

Figure 8:
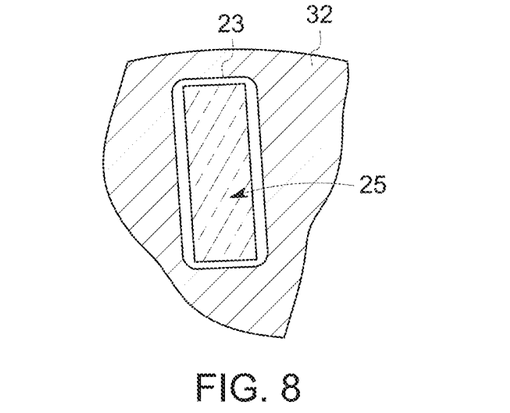
FIG. 8 illustrates partial sections in a transverse direction of one section example of the housings, the insertion holes, the conductive bars and the holes.
Figure 9:
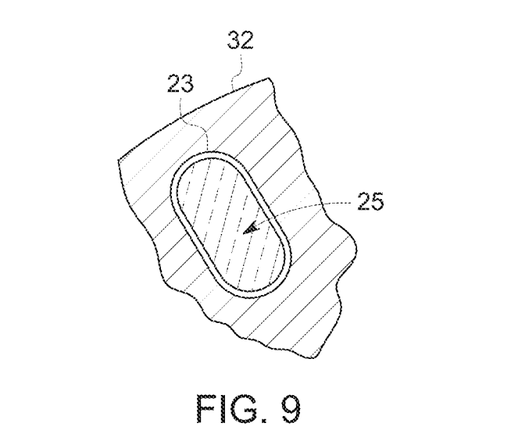
FIG. 9 illustrates partial sections in a transverse direction of another section example of the housings, the insertion holes, the conductive bars and the holes.

FIG. 8 illustrates an example of a rectangular section of the insertion hole 23 and the conductive bar 25, and FIG. 9 illustrates an example of a rounded rectangular section of the insertion hole 23 and the conductive bar 25.

Figure 10:
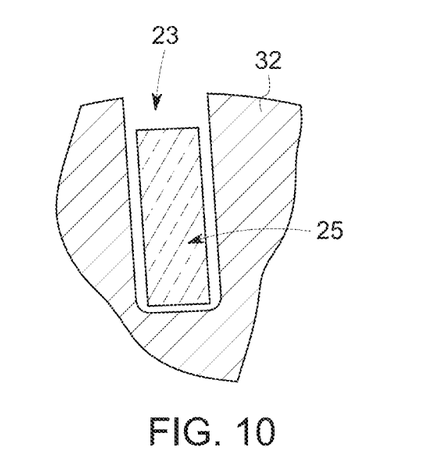
FIG. 10 illustrates partial sections in a transverse direction of yet another section example of the housings, the insertion holes, the conductive bars and the holes.
Figure 11:
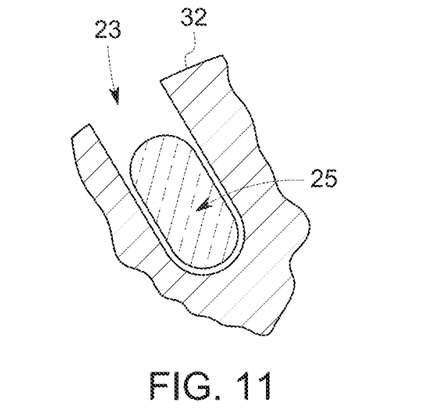
FIG. 11 illustrates partial sections in a transverse direction of a fourth section example of the housings, the insertion holes, the conductive bars and the holes.

FIGS. 10 and 11 describe the sections illustrated in FIGS. 8 and 9 opening towards the outer periphery of the rotor facilitating access to the bars 25 through the outer radial opening of the insertion hole 23.

In addition, the mass of the rotor is reduced, increasing the critical speed of the rotor without affecting the quality of compaction of the magnetic mass.

The embodiments of the rotor 18 described above include short-circuit discs and conductive bars forming a squirrel cage.

Figure 12:
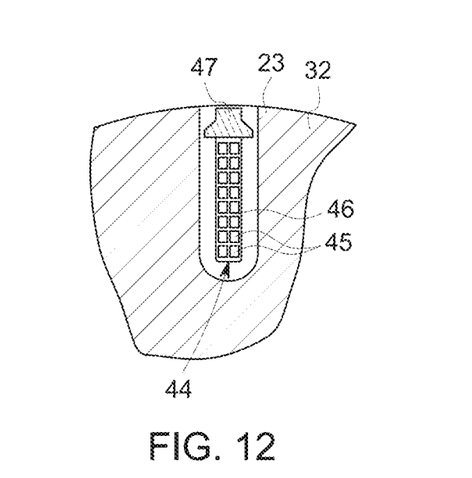
FIG. 12 illustrates a partial section in a transverse direction of a sixth embodiment of the rotor.

As illustrated in FIG. 12, illustrating a sixth embodiment of the rotor 18, the conductive bars 25 can be replaced by coils 44 and the short-circuit discs 24 are removed from the rotor 18 so that the attachment flanges 21, 32 contact the magnetic mass 19.

The coils 44 are inserted into the housings 22 and the insertion holes 23.

Each coil 44 comprises several electrically conductive strands 45 held in an insulating sleeve 46 and extending in the axial direction, the strands 45 being interconnected after passing through the attachment flange 21, 32 so as to form a wound asynchronous rotor.

Alternatively, the strands 45 are connected to a conductive ring to form a synchronous rotor wound with magnetic mass without a through shaft.

The holes 23 for inserting the coils 44 and the housings 22 open in a radial direction to allow the insertion of the coils 44.

A wedge 47 is inserted into the magnetic mass 19 between each coil 44 and the outer periphery of the magnetic mass 19 to hold the coil 44 in its housing 22.

Of course, each half-shaft can comprise an attachment flange according to a different embodiment as described above.

Alternatively, a first half-shaft may comprise an attachment flange according to an embodiment described above and a second half-shaft comprises an attachment flange not comprising insertion holes 23.

The rotor 18 has a uniform compaction of its magnetic mass without decompaction at the periphery ensuring greater bending stiffness and higher rotational speeds than a rotor of the prior art, while maintaining free access to the conductive bars or coils.

In addition, the conductive bars 25 have a larger section and/or the rotor comprising one, two or more rows of conductive bars distributed uniformly on several diameters of the magnetic mass without altering the compaction and bending stiffness of the magnetic mass allowing to produce rotary electric machines of greater power.

I claim:

1. A rotor with a non-through shaft for a rotary electric machine, comprising
   a cylindrical magnetic mass clamped between two half-shafts each comprising an attachment flange connected to the cylindrical magnetic mass,
   axial housings being uniformly provided in the cylindrical magnetic mass on an implantation diameter of the cylindrical magnetic mass in order to house conductive bars,
   at least one attachment flange comprising insertion holes each disposed facing an axial housing of the plurality of axial housings for inserting the conductive bars into the axial housings with the exterior diameter of the attachment flange being substantially equal to the exterior diameter of the cylindrical magnetic mass, the attachment flange including as many insertion holes as the axial housings, and each insertion hole comprising an internal thread, a plug being screwed into the internal thread so as to close the free end of the attachment flange,
   two short-circuit discs each interposed between one of the attachment flanges of the half-shafts and one of the ends of the cylindrical magnetic mass, and
   conductive bars inserted into the axial housings so that the conductive bars and the short-circuit discs form a squirrel cage.

2. The rotor according to claim 1, wherein the axial housings are cylindrical and the insertion holes are circular, the axial housings and the holes being substantially coaxial.

3. The rotor according to claim 1, wherein the axial housings and the insertion holes have a substantially identical rectangular or rounded rectangular section.

4. The rotor according to claim 1, wherein the insertion holes open towards the outer periphery of the rotor.

5. The rotor according to claim 1, further comprising coils inserted into the axial housings and the insertion holes, each coil comprising several strands held in an insulating sleeve and extending in the axial direction so as to form an asynchronous or synchronous wound rotor.

6. The rotor according to claim 5, wherein the insertion holes and the axial housings open in a radial direction to allow the insertion of the coils, a wedge being inserted into the cylindrical magnetic mass between each coil and the outer periphery of the cylindrical magnetic mass to hold the coil in its housing.

7. The rotor according to claim 1, wherein the axial housings and the insertion holes have a substantially identical rectangular or rounded rectangular section.

8. The rotor according to claim 1, wherein the cylindrical magnetic mass comprises compacted magnetic sheets.

9. The rotor according to claim 1, wherein the cylindrical magnetic mass comprises a stack of metal plates.

10. The rotor according to claim 1, wherein the cylindrical magnetic mass comprises a metal body.

11. The rotor according to claim 1, further including screws distributed uniformly on at least one diameter of the rotor so as to keep the cylindrical magnetic mass compacted between the half-shafts, the implantation diameter of the screws being less than the implantation diameter of the axial housings.

12. The rotor according to claim 1, further including tie rods distributed uniformly on at least one diameter of the rotor so as to keep the cylindrical magnetic mass compacted between the half-shafts, the implantation diameter of the tie rods being less than the implantation diameter of the axial housings.

13. The rotor according to claim 1, wherein the attachment flange comprises a chamfer on its face opposite to the cylindrical magnetic mass and extending from the outer periphery of the attachment flange so as to cover the insertion holes.

14. The rotor according to claim 13, wherein the attachment flange further comprises countersinks distributed uniformly on the implantation diameter of the insertion holes so as to reduce the length of the insertion holes.

15. The rotor according to claim 1, wherein the attachment flange comprises a peripheral recess so as to reduce the length of the insertion holes.

16. The rotor according to claim 1, wherein each insertion hole further comprises a groove comprising a seal so as to seal the contact between the plug and the attachment flange.

17. The rotor according to claim 1, wherein the plug further includes a check valve for depressurising the axial housing.

18. A rotary electric machine comprising a rotor with a non-through shaft, the rotor comprising,
a cylindrical magnetic mass clamped between two half-shafts each comprising an attachment flange connected to the cylindrical magnetic mass,
axial housings being uniformly provided in the cylindrical magnetic mass on at least one diameter of the cylindrical magnetic mass in order to house conductive bars,
at least one attachment flange comprising insertion holes each disposed facing an axial housing of the plurality of axial housings for inserting the conductive bars into the axial housings with the exterior diameter of the attachment flange being substantially equal to the exterior diameter of the cylindrical magnetic mass, the attachment flange including as many insertion holes as the axial housings, and each insertion hole comprising an internal thread, a plug being screwed into the internal thread so as to close the free end of the attachment flange,
two short-circuit discs each interposed between one of the attachment flanges of the half-shafts and one of the ends of the cylindrical magnetic mass, and
conductive bars inserted into the axial housings so that the conductive bars and the short-circuit discs form a squirrel cage.

19. A rotor with a non-through shaft for a rotary electric machine, comprising
a cylindrical magnetic mass clamped between two half-shafts each comprising an attachment flange connected to the cylindrical magnetic mass,
axial housings being uniformly provided in the cylindrical magnetic mass on at least one diameter of the cylindrical magnetic mass to house conductive bars,
at least one attachment flange comprising insertion holes each disposed facing an axial housing of the plurality of axial housings for inserting the conductive bars into the axial housings with the exterior diameter of the attachment flange being substantially equal to the exterior diameter of the cylindrical magnetic mass, the attachment flange including as many insertion holes as the axial housings, and the attachment flange comprising a chamfer on its face opposite to the cylindrical magnetic mass and extending from the outer periphery of the attachment flange so as to cover the insertion holes,
two short-circuit discs each interposed between one of the attachment flanges of the half-shafts and one of the ends of the cylindrical magnetic mass, and
conductive bars inserted into the axial housings so that the conductive bars and the short-circuit discs form a squirrel cage.

20. The rotor according to claim 19, wherein the attachment flange further comprises countersinks distributed uniformly on the implantation diameter of the insertion holes so as to reduce the length of the insertion holes.

* * * * *